(12) United States Patent
Feller et al.

(10) Patent No.: US 8,116,943 B2
(45) Date of Patent: Feb. 14, 2012

(54) METHOD AND APPARATUS FOR MINIMIZING DRIVER DISTURBANCE IN A LIMITED BY-WIRE ACTIVE STEERING SYSTEM

(75) Inventors: Ross Feller, Ann Arbor, MI (US); Robert R. Bolio, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 965 days.

(21) Appl. No.: 12/108,731

(22) Filed: Apr. 24, 2008

(65) Prior Publication Data
US 2009/0271070 A1    Oct. 29, 2009

(51) Int. Cl.
 *B62D 5/04* (2006.01)
(52) U.S. Cl. .......... 701/41; 180/400; 180/443; 180/444
(58) Field of Classification Search ................ 180/400, 180/443, 444; 701/41
See application file for complete search history.

(56) References Cited

U.S. PATENT DOCUMENTS

| 5,208,751 | A  | * | 5/1993 | Berkefeld .................. 701/41 |
| 7,016,783 | B2 | * | 3/2006 | Hac et al. .................. 701/301 |
| 7,099,759 | B2 | * | 8/2006 | Ghoneim .................... 701/41 |
| 7,530,422 | B2 | * | 5/2009 | Bolourchi et al. .......... 180/406 |
| 2006/0060412 | A1 | * | 3/2006 | Bolourchi et al. .......... 180/443 |
| 2008/0109134 | A1 | * | 5/2008 | Bolourchi et al. .......... 701/41 |
| 2008/0109135 | A1 | * | 5/2008 | Lemmen et al. ............ 701/41 |
| 2008/0208406 | A1 | * | 8/2008 | Chen et al. ................ 701/41 |

* cited by examiner

*Primary Examiner* — Joanne Silbermann
*Assistant Examiner* — Michael Stabley
(74) *Attorney, Agent, or Firm* — Quinn Law Group, PLLC

(57) ABSTRACT

A method is provided for limiting a steering angle overlay applied by a steering actuator in a limited by-wire active front steering (AFS) system. The method includes determining a maximum rate limit for the steering angle overlay in order to minimize an undesired disturbance to the driver in the form of a torque and/or angle feedback while maximizing the rate of steering overlay allowed for a given set of vehicle operating conditions. The maximum rate limit is determined by a function of the input steering rate and braking level. A limited AFS system includes both steering and braking input devices, a steering actuator, and a controller having an algorithm. The controller uses the algorithm to calculate the maximum overlay rate limit and limits the steering actuator to the maximum overlay rate limit.

13 Claims, 2 Drawing Sheets

METHOD AND APPARATUS FOR MINIMIZING DRIVER DISTURBANCE IN A LIMITED BY-WIRE ACTIVE STEERING SYSTEM

TECHNICAL FIELD

This invention relates to a method and apparatus for controlling a steering actuator during a non-linear maneuver in a vehicle having a limited by-wire active front steering system.

BACKGROUND OF THE INVENTION

Steering system connections in a conventional automotive vehicle are typically provided via direct mechanical linkages between a steering device and the front wheels of the vehicle. For example, in a rack and pinion steering system the rotation of a steering wheel rotates a pinion gear which is engaged with mating notches or teeth in a rack portion of the steering system. Tie rods connect the rack portion to the wheels, so that any rotational motion of the steering wheel ultimately rotates the road wheels to a resultant steering angle, which may vary depending on the steering ratio provided by the steering system. Other steering linkage designs may be used instead of a rack and pinion design, such as worm gears used in a re-circulating ball steering system. In either example, however, all control linkages are purely mechanical in nature.

By way of contrast, in a by-wire steering system an electronically controlled steering actuator is positioned on or in proximity to the front drive axle, and one or more transducers or other sensors measure or detect the steering request or input to a steering device, usually configured as a steering wheel. The sensors can measure a steering angle at the steering device, and/or a rotational force or torque applied to the steering device by an operator of the vehicle. The input signals representing these measured or detected values are then transmitted electrically to a steering actuator, which executes a steering maneuver in response to the signals.

By-wire or electronic steering systems may be configured as a full by-wire system, in which the driver of the vehicle is completely decoupled from the road wheels and all steering input signals are electrically transmitted to the steering actuator. Alternately, a by-wire steering system can be configured as a limited by-wire system, in which a conventional mechanical steering linkage is retained, and in which an electronic steering signal is selectively used to augment or modify a steering response in the steering system.

With respect to limited by-wire systems in particular, such systems can selectively vary a steering ratio to a degree that is determined in part by the speed of the vehicle, and in this manner optimize the steering response. However, during any non-linear maneuver, such as while steering on a low friction surfaces, the overall stability of the vehicle may be less than optimal under certain dynamic conditions.

SUMMARY OF THE INVENTION

Accordingly, a method and apparatus are provided for use in controlling a steering actuator in a vehicle having a limited by-wire active front steering (AFS) system. The method includes measuring or determining an input braking force or level, which is then used along with an input steering angle rate imparted to a steering input device, as inputs to a steering controls algorithm. The method calculates or otherwise determines a maximum rate limit for a steering angle overlay from the steering actuator, which is communicated to the steering actuator from a controller during a predetermined vehicle condition, such as a non-linear maneuver.

The method enhances vehicle stability in part by minimizing transmission of any undesirable feedback to the driver of the vehicle through the steering column and/or a steering input device, such as a steering wheel. This is achieved by limiting the rate of an applied or "overlaid" steering angle, i.e., the steering angle overlay, which is commanded from the steering actuator during the stability maneuver. Within the scope of the invention, the term "AFS system" refers to any limited by-wire system using an electro-mechanical device configured as a steering actuator in order to selectively add or subtract, i.e., "overlay", a steering angle to or from a steering input angle imparted to the AFS system at the steering input device.

According to the method, relatively high steering rates imparted to a steering input device, as well as higher braking input levels, are each indicative or representative of a higher expected level of driver impedance on the steering wheel. As used herein, the term "impedance" refers to the driver's ability to resist motion of the steering wheel given an external torque disturbance. That is, under such high-impedance conditions, a corrective steering angle overlay can be applied at a relatively high rate without providing excessive torque feedback to the driver through the steering input device.

In one embodiment, the method determines the maximum rate limit directly using each of the input variables, either with or without first separately determining maximum rate limits for each input variable. The steering actuator is then controlled or limited by the maximum rate limit.

In another embodiment, the method further processes the maximum rate limit through a second function to further limit or modify the maximum rate limit based on at least one threshold variable or other condition. For example, the second function can include, without being limited to, an embodiment which compares the input braking level to a stored threshold value. The method can then include limiting the actuator to the maximum rate limit when the input braking level does not exceed the threshold value, and to a modified maximum rate limit when the input braking level exceeds the threshold value. The modified maximum rate limit can be a function of the maximum rate limit, with the function in one embodiment including the addition of a predetermined calibration offset to the maximum rate limit.

A limited by-wire AFS system is also provided having a steering input device, a braking input device, a steering actuator, and at least one sensor for measuring an input steering rate from the steering device and an input braking level from the braking device. A controller calculates one or more maximum rate limits for a steering overlay rate. The controller can selectively limit the steering overlay rate from the actuator to one or more maximum rate limits, depending on a dynamic vehicle condition, such as during stability maneuvers, normal vehicle steering, or other desirable predetermined conditions.

The above objects, features, and advantages, and other objects, features, and advantages, of the present invention are readily apparent from the following detailed description of the best mode for carrying out the invention when taken in connection with the accompanying drawings.

DESCRIPTION OF THE PREFERRED EMBODIMENTS

Figure 1:
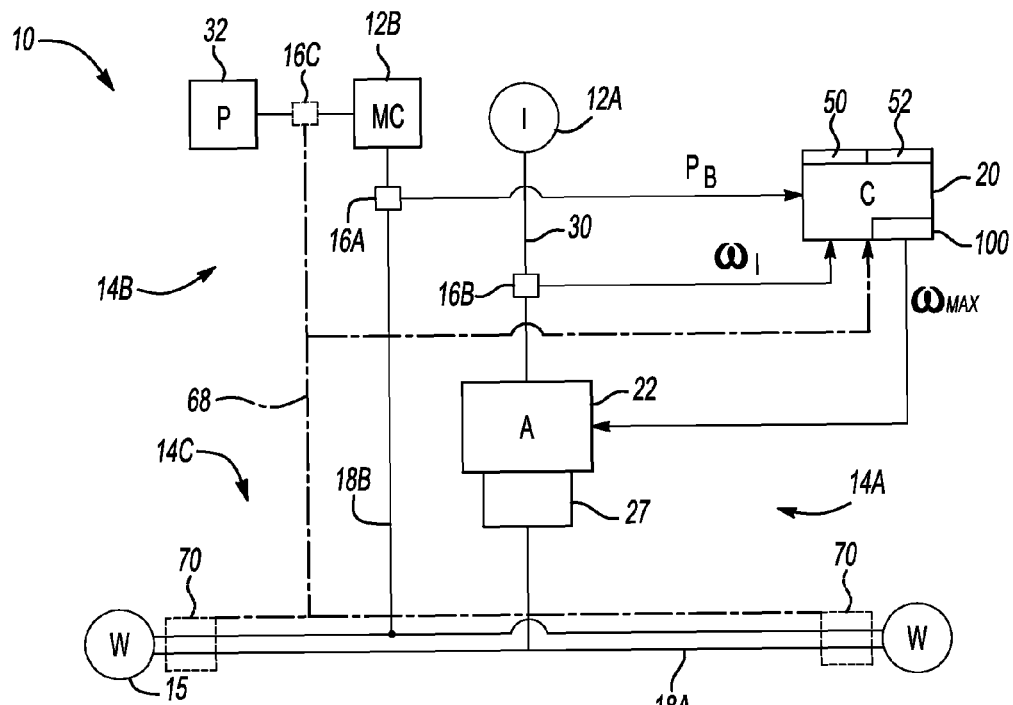
FIG. 1 is a schematic illustration of a vehicle having an active front steering (AFS) system, a braking system, and a steering control algorithm or method.

Referring to the drawings, wherein like reference numbers correspond to like or similar components throughout the several figures, and beginning with FIG. 1, a vehicle 10 includes a limited by-wire active front steering system 14A and a braking system 14B. The vehicle 10 has a front drive axle 18A connected to a pair of front road wheels (W) 15. The wheels 15 are selectively steerable using the steering system 14A, as described below, and the vehicle 10 can be slowed or stopped via the braking system 14B.

The steering system 14A includes an integrated control unit or controller (C) 20, which is configured, programmed, or otherwise provided with access to a steering control method or algorithm 100 described below with reference to FIGS. 2 and 2A. In one embodiment, the controller 20 can be a dedicated steering controller, but the controller 20 is not intended to be so limited. The steering system 14A also includes a steering column 30 that mechanically couples or links a steering device (I) 12A with the wheels 15, with the steering device 12A being configured as a steering wheel, a hand wheel, or any other mechanical, electrical, or electromechanical driver-operable device suitable for steering the vehicle 10.

The linkage between the steering device 12A and the wheels 15 includes a mechanical gear reduction mechanism 27, for example a rack-and-pinion system or any another steering system configured for providing gear reduction capabilities. As will be understood by those of ordinary skill in the art, the gear mechanism 27 provides a mechanical gear ratio which the steering system 14A can actively modify as needed under changing vehicle speeds and other dynamic operating conditions.

The steering system 14A further includes a steering actuator (A) 22 which can be configured, for example, as a geared brushless DC electric motor, a harmonic motor, or other suitable device capable of applying or overlaying an angle to modify the input steering angle imparted to the steering device 12A. One or more sensors 16B are positioned on or in proximity to the steering column 30 and/or the steering device 12A, and are configured for detecting, measuring, or otherwise determining the driver-commanded or input steering rate ($\omega_I$) corresponding to the angular rate of the steering device 12A, as well as for transmitting the input steering rate ($\omega_I$) to the controller 20 for use by the algorithm 100.

Likewise, a braking input device (P) 32, such as a brake pedal, is connected in one embodiment to a master cylinder (MC) 12B via hydraulic brake lines 18B. One or more sensors 16A are positioned on or in proximity to the master cylinder 12B and/or the brake lines 18B, and are configured for detecting, measuring, or otherwise determining a driver-commanded or input braking level ($P_B$) corresponding to the level of force applied by a driver to the braking input device 32, as well as for transmitting the input braking level ($P_B$) to the controller 20 for use by the algorithm 100. The input braking level ($P_B$) indicates the driver's braking intent, and is not necessarily the same as a braking level or force as measured at the wheels 15, especially during electronic braking intervention, during anti-lock braking system (ABS) application, and/or during stability applications.

Alternatively, the braking system 14B can be an electronic braking system or EBS 14C, shown in phantom in FIG. 1. In such a system, electrical signals are used to transmit the braking input level ($P_B$) along wires 68, or wirelessly, to a motor/generator 70 positioned in proximity to the drive axle 18A and/or the wheels 15. Sensors 16C measure the force or pressure which is applied by a driver of the vehicle 10 to the braking input device 32, and transmit or communicate the input braking level $P_B$ to the motor/generators 70 for braking the vehicle 10.

Still referring to FIG. 1, the steering actuator 22 is continuously connected to the wheels 15, and is configured for applying or "overlaying" an actuator angle to the input steering angle, with the wheels 15 being steered using the resultant angle. That is, the overlay corresponds to a positive or a negative desired correction angle to be applied to the input steering angle. Under some conditions the application of this corrective angle may cause feedback through the steering column 30. Therefore, as will be discussed with reference to FIGS. 2 and 2A below, the controller 20 calculates one or more maximum overlay rate limits, or $\omega_{Max}$, which will be described below with reference to FIG. 2 and referred to hereinafter as the maximum rate limit. The maximum rate limit ($\omega_{Max}$), or a derivation thereof in the embodiment of FIG. 2A, limits the amount of overlay from the actuator 22 in order to minimize a disturbance, i.e., an undesired torque and/or angle feedback, to the driver of the vehicle 10.

Figure 2:
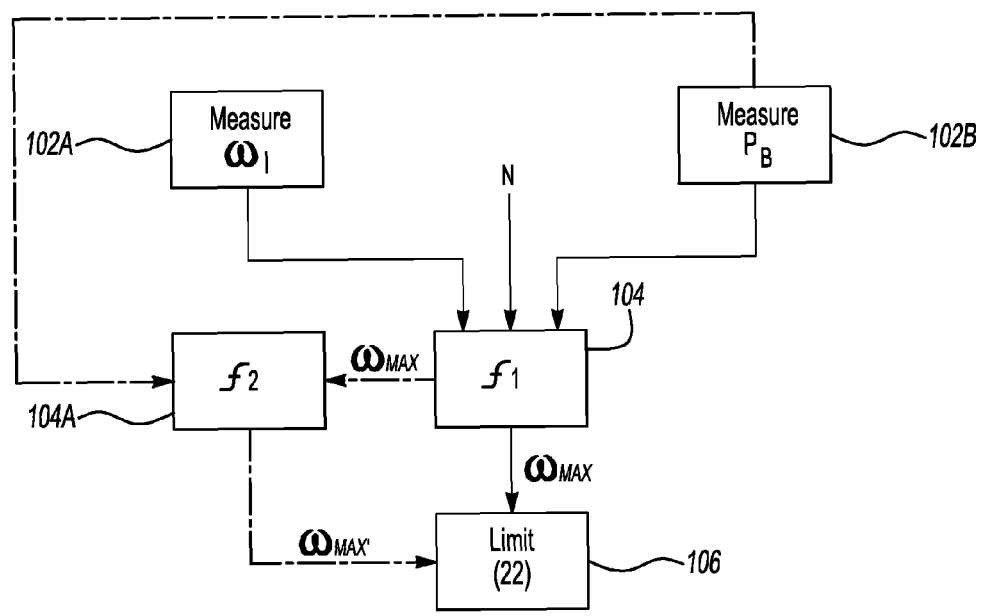
FIG. 2 is a flow chart describing the steering control method of the vehicle shown in FIG. 1.

Referring to FIG. 2 with reference to the various components of the vehicle 10 shown in FIG. 1, the algorithm 100 begins with steps 102A and 102B and measures a set of input variables for use in later steps within the algorithm 100. At step 102A, the sensors 16B measure, detect, calculate, or otherwise determine the input steering rate ($\omega_I$) imparted to the steering device 12A. At step 102B, the sensors 16A similarly determine the input braking level ($P_B$), whether at the master cylinder 12B or alternately via the sensor 16C when the EBS 14C is used. Once the input steering rate ($\omega_I$) and input braking level ($P_B$) have been determined, and temporarily stored within the controller 20, the algorithm 100 proceeds to step 104.

At step 104, the algorithm 100 uses the input steering angle rate ($\omega_I$), the input braking level ($P_B$), and the speed (N) of the vehicle 10 as input variables into a first function, abbreviated $f_1$ in FIG. 2, to thereby calculate or otherwise determine the maximum rate limit ($\omega_{MAX}$), such as by accessing one or more lookup tables 50, 52. Alternately, the input braking level ($P_B$) and the input steering angle rate ($\omega_I$) can each be considered separately in calculating different rate limits corresponding to each input variable, with such limits then fed into the function ($f_1$) to determine the maximum rate limit ($\omega_{MAX}$). Function $f_1$ can include applying a linear step function to the input braking level ($P_B$) and/or a non-linear function to the input steering rate ($\omega_I$). As will be understood by those of ordinary skill in the art, the speed (N) of the vehicle can be measured directly at the wheels 15 or by measuring or detecting a rotational speed of a transmission output member (not shown), or via a signal from a speedometer.

As noted above, the first function $f_1$ can also include accessing one or more lookup tables 50, 52 that are previously populated with calibrated data and stored within the controller 20. As will be understood by those of ordinary skill in the art, a lookup table such as tables 50 and 52 are any recorded, programmed, or stored data table containing such calibrated values for determining or selecting the maximum rate limit ($\omega_{MAX}$), with the lookup tables 50, 52 being indexed by the required variables, such as the input steering angle rate ($\omega_I$), the input braking level ($P_B$), and the speed (N) of the vehicle 10. Once the maximum rate limit ($\omega_{MAX}$) is calculated or otherwise determined, the algorithm 100 proceeds to step 106.

At step 104A, which is shown in phantom as an alternate step subsequent to step 104 explained above, the algorithm 100 processes the maximum rate limit ($\omega_{MAX}$) determined at step 104 through a second function $f_2$ to determine whether to pass through the maximum rate limit ($\omega_{MAX}$) on to step 106, or whether instead to pass through a modified maximum rate limit ($\omega_{MAX}'$) depending on a predetermined vehicle operating condition. In one embodiment, the algorithm 100 can compare the values of one or more of the input variables to a corresponding stored threshold, such as the braking input level ($P_B$) determined at step 102B, as describe below with reference to FIG. 2A. The maximum rate limit, whether it is the maximum rate limit $\omega_{MAX}$ or a modified maximum rate limit $\omega_{MAX}'$ can then be used for controlling the actuator 22 (see FIG. 1) depending on the outcome of the second function $f_2$.

Figure 2A:
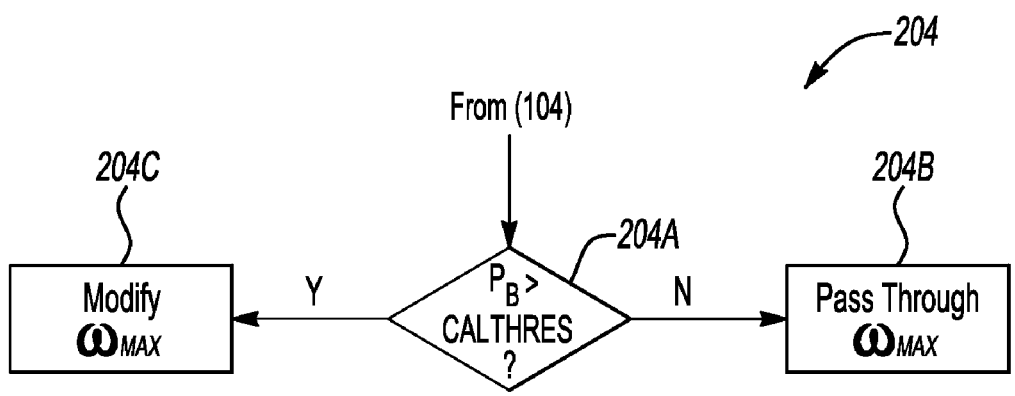
FIG. 2A is a flow chart describing an alternate embodiment of the method of FIG. 2.

Referring briefly to FIG. 2A, an exemplary embodiment of step 104A is depicted as step 204, which consists of the steps 204A, 204B, and 204C. Beginning with step 204A, the value of the maximum rate limit ($\omega_{MAX}$) from step 104 (see FIG. 2) is processed through the second function ($f_2$), which first determines whether to pass through the maximum rate limit ($\omega_{MAX}$) or whether to first modify the maximum rate limit ($\omega_{MAX}$) after comparing an input variable, represented here as the input braking level ($P_B$) but not limited thereto, to a stored calibration threshold, represented in FIG. 2A as "CalThres". If the input braking level ($P_B$) exceeds the stored calibration value CalThres, the algorithm 100 proceeds to step 204C, otherwise it proceeds to step 204B.

At step 204B, having determined at step 204A that the input braking level ($P_B$) does not exceed the stored calibrated threshold (CalThres), the algorithm 100 passes the maximum rate limit ($\omega_{MAX}$) through to step 106, and proceeds to step 106.

At step 204C, having determined at step 204A that the input braking level ($P_B$) exceeds the stored calibrated threshold (CalThres), the algorithm 100 uses the function $f_2$ to modify the maximum rate limit ($\omega_{MAX}$). In one embodiment, the modified maximum rate limit ($\omega_{MAX}'$) is a function of the maximum rate limit ($\omega_{MAX}$), such as adding a predetermined or calibrated offset to the maximum rate limit ($\omega_{MAX}$) calculated previously at step 104 (see FIG. 2). However, the modified maximum rate limit ($\omega_{MAX}'$) can be determined in other ways, such as by using a designated multiplier or other suitable function sufficiently compensating for the excessive input braking level ($P_B$). After determining which of the maximum rate limits ($\omega_{MAX}$ or $\omega_{MAX}'$) to use at step 106, the algorithm 100 proceeds to step 106 (see FIG. 2).

Referring again to FIG. 2, at step 106, the algorithm 100 transmits, relays, or otherwise communicates the maximum rate limit ($\omega_{MAX}$), or a modified version thereof if alternate step 104A is executed, to a target angle algorithm (not shown) for use in controlling the actuator 22. The amount of steering angle overlay imparted by the steering actuator 22 is thus limited to one of the maximum rate limit ($\omega_{MAX}$) or the modified maximum rate limit ($\omega_{MAX}'$). The limit can be selectively applied based on different vehicle operating conditions, such as during stability maneuvers, normal driving conditions, or other predetermined conditions. The limited amount of steering angle overlay results in minimized feedback though the steering column 30 to the steering inputs device 12A while still maximizing the rate of overlay allowed for a given set of conditions. The maximum rate limit ($\omega_{Max}$) determined via the algorithm 100 varies from a theoretical floor value to a theoretical ceiling value based on the previously described conditions that can occur in the operation of the vehicle 10, and limits the amount of steering overlay from the actuator 22.

While the best modes for carrying out the invention have been described in detail, those familiar with the art to which this invention relates will recognize various alternative designs and embodiments for practicing the scope of the invention within the scope of the appended claims.

The invention claimed is:

1. A method for limiting a rate of steering angle overlay that can be applied by a steering actuator in a limited by-wire active front steering (AFS) system for a vehicle, the method comprising:
    measuring an input steering angle rate;
    measuring an input braking level;
    calculating a maximum rate limit for the rate of steering angle overlay as a function of the input steering rate and the input braking level; and
    selectively limiting the rate of steering angle overlay to the maximum rate limit based on a predetermined vehicle condition.

2. The method of claim 1, wherein calculating the maximum rate limit includes accessing a lookup table indexed by at least one of the input steering rate, the input braking level, and a speed of the vehicle.

3. The method of claim 1, wherein the predetermined vehicle condition is a non-linear stability maneuver.

4. The method of claim 1, wherein measuring an input steering rate from a steering device includes detecting a rotational velocity of a steering wheel.

5. The method of claim 1, wherein measuring an input braking level includes one of detecting a fluid pressure of a master cylinder pressure and detecting an electronic braking force signal.

6. The method of claim 1, further comprising modifying the maximum rate limit when at least one of the input steering rate and the input braking level exceed a corresponding calibrated threshold.

7. A method for controlling a steering actuator in a by-wire steering system of a vehicle, the method comprising:
    measuring an input steering rate imparted to a steering wheel of the vehicle;
    measuring an input braking level imparted to a master cylinder;
    determining a maximum rate limit for a rate of steering angle overlay delivered from the steering actuator based on a function of each of the input steering rate and the input braking level; and
    limiting the rate of steering angle overlay to the maximum rate limit.

8. The method of claim 7, further comprising modifying the maximum rate limit when a predetermined variable exceeds a calibrated threshold.

9. The method of claim 8, wherein the calibrated threshold is a calibrated braking level, and wherein the predetermined variable is the input braking level.

10. The method of claim 7, wherein determining the maximum rate limit includes at least one of applying a linear step function to the input braking level and a non-linear function to the input steering rate.

11. A limited by-wire active front steering system for use with a vehicle, the system comprising:
    a steering input device having a measurable input steering angle rate;
    a braking input device having a measurable input braking level;

a steering actuator configured for overlaying a corrective steering angle to thereby modify the input steering angle; and a controller configured for calculating a maximum rate limit for the corrective steering angle as a function of the input braking level and the input steering rate, and for limiting a rate of overlay of the corrective steering angle to the maximum rate limit to thereby enhance the stability of the vehicle during a non-linear steering maneuver.

12. The system of claim 11, wherein the controller is configured for modifying the maximum rate limit when the input braking level exceeds a threshold braking value.

13. The system of claim 11, wherein the input braking level is one of a master cylinder braking pressure and an electronic braking force.

* * * * *